(12) United States Patent
Linari et al.

(10) Patent No.: US 10,686,751 B2
(45) Date of Patent: Jun. 16, 2020

(54) METHODS AND APPARATUS FOR INTELLIGENT DOMAIN NAME SYSTEM FORWARDING

(71) Applicant: DYNAMIC NETWORK SERVICES, INC., Redwood Shores, CA (US)

(72) Inventors: Amy Linari, Berkeley, CA (US); Erich Rickheit, Raymond, NH (US); Richard Gibson, Milford, NH (US); Joseph Abley, London (CA)

(73) Assignee: DYNAMIC NETWORK SERVICES, INC., Redwood Shores, CA (US)

(*) Notice: Subject to any disclaimer, the term of this patent is extended or adjusted under 35 U.S.C. 154(b) by 0 days.

(21) Appl. No.: 16/080,684

(22) PCT Filed: Mar. 9, 2017

(86) PCT No.: PCT/US2017/021514
§ 371 (c)(1),
(2) Date: Aug. 29, 2018

(87) PCT Pub. No.: WO2017/156231
PCT Pub. Date: Sep. 14, 2017

(65) Prior Publication Data
US 2019/0097965 A1 Mar. 28, 2019

Related U.S. Application Data (60) Provisional application No. 62/305,602, filed on Mar. 9, 2016.

(51) Int. Cl.
*H04L 29/12* (2006.01)
*H04L 29/06* (2006.01)
*H04L 29/08* (2006.01)

(52) U.S. Cl.
CPC .......... *H04L 61/1511* (2013.01); *H04L 29/06* (2013.01); *H04L 61/1576* (2013.01);
(Continued)

(58) Field of Classification Search
CPC ............. H04L 61/1511; H04L 61/1576; H04L 61/6013; H04L 67/2823; H04L 67/2852
See application file for complete search history.

(56) References Cited

U.S. PATENT DOCUMENTS 7,917,616 B2 * 3/2011 Trace ................ H04L 29/12066
709/217
8,332,487 B2 * 12/2012 Trace ................ H04L 29/12066
709/200
(Continued)

FOREIGN PATENT DOCUMENTS

AU 2009225283 A1 5/2010

OTHER PUBLICATIONS

Internet Systems Consortium. "Bind 9 Administrator Reference Manual", Bind Version 9.10.3, 2015, 224 pages. (Year: 2015).*
(Continued)

*Primary Examiner* — George C Neurauter, Jr.
(74) *Attorney, Agent, or Firm* — Invoke (57) ABSTRACT

In some instances, it could be advantageous to return different IP addresses for a query relating to a domain name. Conventional methods for returning different IP addresses for a given query include modifying the authoritative DNS server. However, such modifications do not scale well and increase the complexity of the system. To address this problem, a proxy server configured for intelligent DNS forwarding is disclosed. DNS queries from an end user are forwarded to the authoritative DNS server via the proxy server. Responses from the authoritative DNS servers include metadata with embedded policies and rules defined
(Continued)

by customers. The proxy server processes the metadata by executing the embedded policies and rules, looking up network resources based on the embedded rules, and determining an optimal IP address based on the look up data and embedded policies. This optimal IP address is sent to the end user in response to the query.

15 Claims, 5 Drawing Sheets

(52) U.S. Cl.
CPC ........ *H04L 61/6013* (2013.01); *H04L 63/168* (2013.01); *H04L 63/20* (2013.01); *H04L 67/2823* (2013.01); *H04L 67/2852* (2013.01); *H04L 67/34* (2013.01)

(56) References Cited

U.S. PATENT DOCUMENTS

| | | | | |
|---|---|---|---|---|
| 8,429,715 | B2* | 4/2013 | Meren | H04L 63/0823 726/3 |
| 8,656,490 | B1 | 2/2014 | Sobel | |
| 8,762,554 | B2* | 6/2014 | Trace | H04L 29/12066 709/217 |
| 9,338,182 | B2* | 5/2016 | Devarapalli | H04L 61/1511 |
| 9,813,337 | B2* | 11/2017 | Trace | H04L 63/0823 |
| 10,110,614 | B2* | 10/2018 | Kaliski, Jr. | H04L 61/1511 |
| 10,367,825 | B2* | 7/2019 | Maresca | H04L 61/1511 |
| 2004/0194102 | A1* | 9/2004 | Neerdaels | H04L 29/06 718/100 |
| 2005/0286514 | A1 | 12/2005 | Cheshire | |
| 2008/0189437 | A1* | 8/2008 | Halley | H04L 12/14 709/245 |
| 2012/0096166 | A1* | 4/2012 | Devarapalli | H04L 61/1511 709/226 |
| 2012/0117379 | A1 | 5/2012 | Thornewell et al. | |
| 2013/0173769 | A1 | 7/2013 | Seastrom et al. | |
| 2014/0344925 | A1 | 11/2014 | Muthiah | |
| 2017/0019371 | A1* | 1/2017 | Osterweil | H04L 61/1511 |
| 2017/0222974 | A1* | 8/2017 | Cathrow | H04L 61/1511 |
| 2019/0044955 | A1* | 2/2019 | Kaliski, Jr. | H04L 61/1511 |

OTHER PUBLICATIONS

Yong Jin et al. "An Advanced Client Based DNSSEC Validation and Preliminary Evaluations Toward Realization", published by IEEE, 2016, 6 pages. (Year: 2016).*

Yong Jun et al. "A Client Based DNSSEC Validation Mechanism with Recursive DNS Server Separation", IEEE ICTC 2018, 6 pages. (Year: 2018).*

Xavier Torrent Gorjon. "Discovery method for a DNSSEC validating stub resolver", University of Amsterdam, MSC System and Network Engineering, Jul. 2015, 33 pages. (Year: 2015).*

J. Damas et al. "Request for Comments (RFC) 6891: Extension Mechanisms for DNS (Ends(0))", Network Working Group, Apr. 2013, 16 pages. (Year: 1999).*

D. Conrad. "Request for Comments (RFC) 3225: Indicating Resolver Support of DNSSEC", Network Working Group, Dec. 2001, 6 pages. (Year: 2001).*

R. Arends et al. "Request for Comments (RFC) 4034: Resource Records for the DNS Security Extensions", Network Working Group, Mar. 2005, 29 pages. (Year: 2005).*

R. Bellis. "Request for Comments (RFC) 5625: DNS Proxy Implementation Guidelines", Network Working Group, Aug. 2009, 12 pages. (Year: 2009).*

Arends et al., "DNS Security Introduction and Requirements", RFC 4033, Mar. 2005, pp. 1-22.

Arends et al., Protocol Modifications for the DNS Security Extensions, RFC 4035, Mar. 2005, pp. 1-53.

* cited by examiner

METHODS AND APPARATUS FOR INTELLIGENT DOMAIN NAME SYSTEM FORWARDING

CROSS-REFERENCE TO RELATED APPLICATION(S)

This application is a national stage of International Application No. PCT/US2017/021514, filed Mar. 9, 2017, which claims the benefit of U.S. Provisional Application No. 62/305,602, filed on Mar. 9, 2016, the entire contents for both of which are hereby incorporated by reference as if fully set forth herein.

BACKGROUND

The Domain Name System (DNS) is a hierarchical distributed naming system for computers, services, or any resource connected to the Internet or a private network. It associates various information with domain names assigned to each of the participating entities. DNS also translates more readily memorized domain names to the numerical Internet Protocol (IP) addresses used to locate and identify computer services and devices with the underlying network protocols.

Authoritative DNS servers, also known as authoritative name servers or authoritatives, respond to queries about the mapping of domain names to numerical IP addresses and also to requests for other resource records (RRs), such as mail exchanger (MX) records. To respond to these queries, each authoritative has its own DNS database of DNS records. Common types of records stored in a DNS database include IP addresses (A and AAAA), Simple Mail Transfer Protocol (SMTP) MX records, and name server (NS) records for the corresponding domain. A DNS database can also store records for other types of data, including domain name aliases (CNAME) and DNS Security Extension (DNSSEC) records, which can be used to authenticate DNS records.

To add a new domain to the Internet, basic DNS standards call for the domain owner, or registrant, to purchase a domain name from a registrar and specify the names of the authoritative DNS servers used to answer queries for the new domain. The registrant obtains authoritative DNS service from an authoritative DNS provider (such as Dynamic Network Services Inc. of Manchester, N.H.) and configures the records for its domain name (or more precisely, zone) with the authoritative DNS provider. When an end user's machine attempts to access the new domain name, it asks a recursive DNS server to retrieve a DNS record for the new domain, most commonly an A or AAAA (IPv4 or IPv6 address). The recursive server locates the authoritative DNS server maintained by the authoritative DNS provider, then queries the authoritative DNS server for the DNS record. The recursive DNS server returns the authoritative DNS server's answer to the end user's machine and may also cache the answer according to its time to live (TTL). The end user's machine then attempts to access the domain using the DNS record provided by the authoritative DNS server.

SUMMARY

Embodiments of the present technology include methods of responding to DNS queries. An example method comprises receiving a DNS query from a client at a proxy server. The proxy server modifies the DNS query to include a request for metadata and transmits the DNS query to an authoritative DNS server. The proxy server receives a response to the DNS query from the authoritative DNS server, which includes the metadata, from the authoritative DNS server. The proxy server modifies the response to the DNS query based at least in part on the metadata and transmits the response to the DNS query from the proxy server to the client.

The proxy server can modify the DNS query by setting a DNS Security (DNSSEC) OK (DO) flag in the DNS query. The metadata can be a Requested Resource Signature (RRSIG) record. The response to the DNS query received by the proxy server can include receiving metadata, which includes a program, and receiving a plurality of IP addresses. In this case, the proxy server modifies the response to the DNS query by executing the program. During execution, the proxy server may reorder the plurality of IP addresses, filter the plurality of IP addresses and select an IP address from the plurality of IP addresses. In some embodiments, the proxy server modifies the response to the DNS query by removing the metadata from the response to the DNS query and then transmits the response to the client. The proxy server can modify the response to the DNS query by applying a sequence of rules in order to transmit the response to the client.

Other embodiments of the present technology include systems for generating a plurality of responses to a DNS query. An example system comprises a proxy server that is in digital communication with a DNS authoritative server and a client device. The proxy server is configured to receive a DNS query from the client device. The proxy server can modify the DNS query to include a request for metadata, transmit the DNS query to the authoritative server, receive a response to the DNS query, which includes the metadata, from the authoritative server. The proxy server can modify the response to the DNS query based at least in part on the metadata and transmit the response to the DNS query to the client.

The proxy server can be configured to modify the DNS query by setting a DNS Security (DNSSEC) OK (DO) flag in the DNS query. The metadata can be a RRSIG. The response to the DNS query from the authoritative DNS server can include a program and a plurality of IP addresses. In this case, the proxy server is configured to execute the program. The proxy server can execute the program by reordering the plurality of IP addresses, filtering the plurality of IP addresses, and selecting an IP address from the plurality of IP addresses. The proxy server can be configured to remove the metadata from the response to the DNS query before transmitting the response to the client device. The proxy server can be configured to modify the response to the DNS query by applying a sequence of rules to transmit the response to the client device.

Still other embodiments of the present technology include methods for responding to a DNS query. An example method comprises receiving the DNS query from a client at a proxy server. The proxy server determines if the DNS query includes a request for metadata. In response to determining that the DNS query includes the request for metadata, the proxy server transmits the DNS query from the proxy server to an authoritative DNS server. In response to determining that the DNS query does not include the request for metadata, the proxy server modifies the DNS query to include a request for metadata and transmits the DNS query from the proxy server to the authoritative DNS server. The proxy server receives a response to the DNS query, which includes the metadata, from the authoritative DNS server. The proxy server modifies the response to the DNS query based at least in part on the metadata and transmits the response to the DNS query from the proxy server to the client.

The response to the DNS query received from the authoritative DNS server can include a program that is included in the metadata and a plurality of IP addresses. Modifying the response to the DNS query can include executing the program at the proxy server to select an IP address from the plurality of IP addresses. Modifying the response to the DNS query can include the proxy server selecting the IP address based on at least one of a latency, an availability, or a priority of the IP address. In response to determining that the DNS query does not include the request for metadata, the proxy server can remove the metadata from the response before transmitting the response to the client.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

An authoritative DNS server responds to queries about the name of website by returning the IP address that points to the website. Ordinarily, an authoritative DNS server should give the same IP address every time for queries directed to a given website, assuming that the IP address hasn't changed. But there are times when it would be advantageous for the authoritative DNS server to return different responses (e.g., an IP address) when queried about a given domain name—that is, for the authoritative DNS server to give different answers to the same query. (This behavior is generally called "advanced DNS services.") For instance, pointing different end users to different IP addresses could be used for load balancing at the directory level, to ensure that each end user was served by the closest server (e.g., the server with the lowest latency or shortest geographic distance), or to provide alias functionality or CNAME flattening (aka ALIAS) to get around limitations of the DNS standard itself. Likewise, it can be useful for the authoritative DNS server to return a CNAME that points to different other names depending on recursor geography.

Unfortunately, the DNS standard doesn't provide for different responses to the same query. To get around this limitation, the authoritative DNS server may be modified to provide different responses to a given query depending, for example, on the IP address of the recursive server making the query or the time of day. The responses may also be selected randomly from a larger set to balance the load across multiple servers. Typically, the modification is based on information or an algorithm or code provided by the registrant. For example, the authoritative DNS server may be modified to store the desired behavior for the domain in question inside the DNS data as a special record type and return it according to modified code.

But these modifications are generally custom and tend to scale poorly, in part because of the complexity of authoritative DNS servers. Traditionally, an authoritative DNS server is usually optimized for certain use cases, so modifying it to provide custom answers often leads to scaling issues. One example of those scaling issues is loading too much into memory because one has selected an in-memory server. Loading memory can take an inconveniently long time for a large number of records. Changing the scaling or other properties of the authoritative by swapping for a different one often leads to redoing the custom work and possibly maintaining different versions in different systems. Also, these systems are complex and difficult to maintain. Maintaining a customized authoritative DNS server can also be complicated, especially if the records change over time.

The present technology provides ways to generate different responses to the same query using a proxy server coupled to the authoritative DNS server instead of modifying the authoritative DNS server. As a result, the proxy server does not have to retain any customer data or advanced services specifications, so it isn't affected by scaling of that data or the access patterns to it.

A System for Intelligent DNS Forwarding

Figure 1:
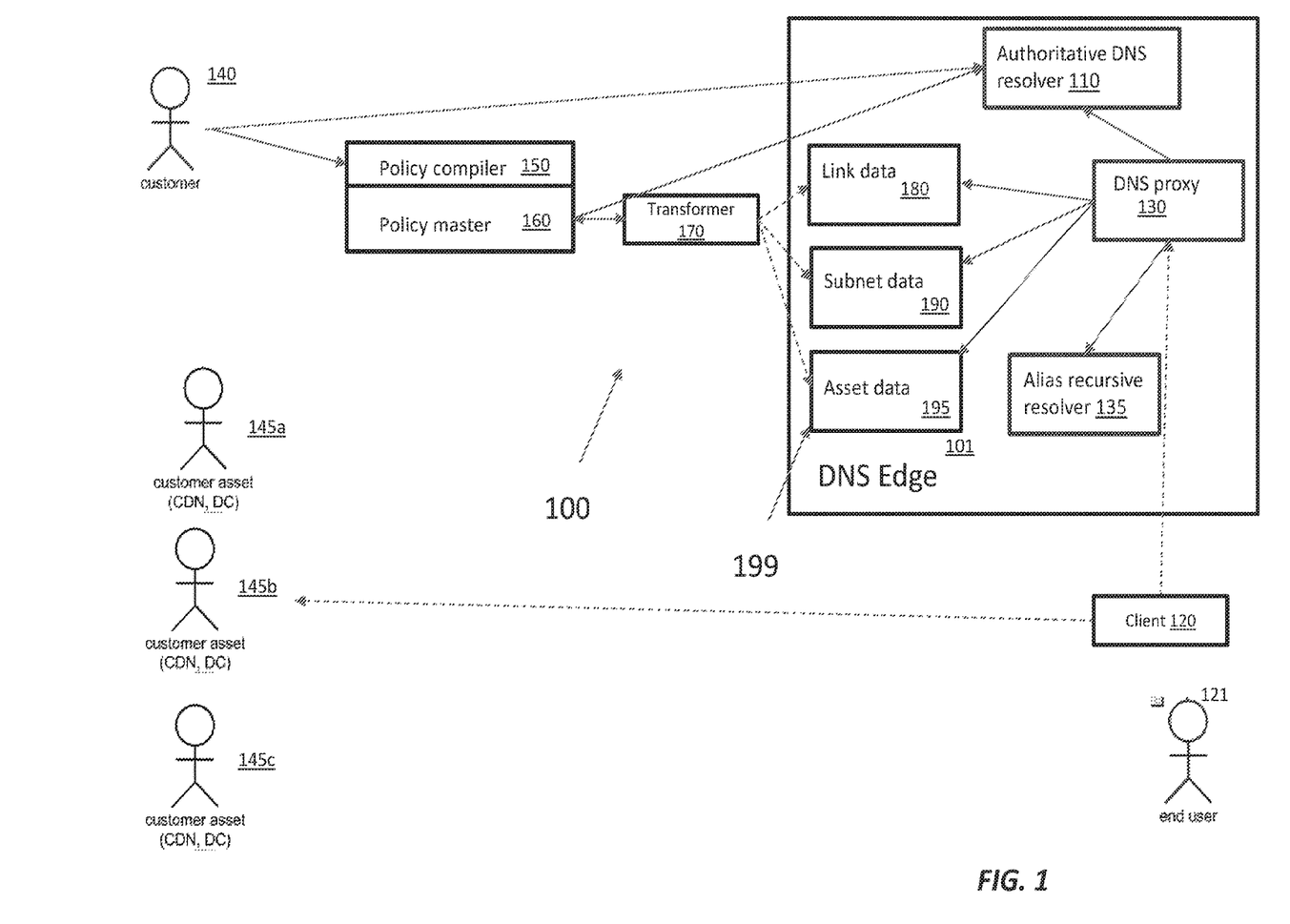
FIG. 1 illustrates a system including a proxy server that facilitates intelligent DNS forwarding.

FIG. 1 is an illustration of a system 100 including a proxy server 130, also called a DNS proxy server or DNS proxy, configured to detect DNS queries from a client device 120 and process responses from an authoritative DNS resolver 110 to provide intelligent DNS forwarding. (FIG. 1 is a simplified version for ease of understanding.) The system 100 also includes an authoritative DNS resolver 110, an alias resolver 135, and network resources (memory) 199. These devices and the proxy server 130 are located at the DNS edge 101 and are operably coupled (e.g., via the internet) to a transformer 170, which in turn is coupled to a policy master 160 and a policy compiler 150.

As readily appreciated by those of skill in the art, the proxy server 130, authoritative server 110, recursive resolver 135, policy compiler 150, policy master 160, and transformer 170 can each be implemented as computer-executable code stored in computer-readable, nonvolatile memory and executed by a processor. They can be collocated or distributed as desired using suitable hardware and connections. Similarly, the network resources 199 can be implemented as any suitable type of computer-readable, nonvolatile memory that is communicatively coupled to the proxy server 130 and the transformer 170.

As explained in greater detail below, a customer 140 configures DNS records for its domain name(s) with the authoritative DNS resolver 110, just as in a conventional system. These domain names may be associated with one or more customer assets 145a-145c (collectively, customer asset 145), such as content delivery networks (CDNs), each of which has a different IP address and can be resolved as the IP address corresponding to a given domain name. The customer 140 sets one or more dynamic steering policies for directing traffic to these IP addresses in response to domain name queries from users 121. For instance, a customer 140 may use a web-based interface to specify latency, availability, geolocation, and other criteria for determining which IP address to supply in response to a given DNS query from an end user 121. The network resources 199 may store the link data 180, subnet data 190, and/or asset data 195 corresponding to these criteria for use by the proxy server 130 in intelligent DNS forwarding. (Link data 180 and subnet data 190 can also be stored in memory data structures local to the proxy 130.) More generally, a dynamic steering policy includes criteria, data, and rules from the customer 140 and possibly from the end user 121 as well for supplying an IP address in response to a DNS query for one of the customer's domain names.

The policy master 160 stores dynamic steering policies from the customer 140, e.g., as one or more functions written in a formal computer language. The policy master 160 generates programs including these functions with a policy compiler 150. The policy compiler 150 can be implemented as a simple executable wrapper configured to build these programs such that the functions including dynamic steering policies can be interpreted by the proxy server 130. The policy master 160 may supply customer configuration of advanced services (e.g., as programs in Requested Resource Signature (RRSIG) records) to the authoritative DNS resolver 110 as shown in FIG. 1.

Dynamic steering policies and attachment data, such as link data 180, subnet data 190, and asset data 195, from the policy master 160 are transmitted via the transformer 170 to the network resources 199. The transfomer 170 propagates dynamic data (e.g., link data 180, subnet data 190, asset data 195, etc.) to the edge 101. The transformer 170 gets that data by listening to events on various channels and processing them into declarative information like "Mean latency to ExampleCDN from behind resolvers in 192.0.2.0/24 is 42 milliseconds" or "198.51.100.0/24 is in France" or "webserver2.example.com is down."

Hence, the network resources 199 store data provided by the customer 140 or acquired relating to latency, health, geolocation, availability and other criteria that are used to determine a response to the DNS query. For instance, the link data 180 stores cooked latency performance data that may be aggregated (e.g., every five minutes) by the authoritative DNS resolver 110. The subnet data 190 stores geolocation data for each customer asset 145 and possibly for each client 120. Asset data 195 includes availability data such as health of an IP address.

In operation, the proxy server 130 uses the policies defined by the customer 140 and based on link data 180, subnet data 190, and/or asset data 195, among other things, to steer the client 120 to an appropriate customer asset 145a, 145b, or 145c. The proxy server 130 receives queries from the client 120 for the DNS server 110 and inspects them to see if they include a request for metadata, such as DNSSEC information. If the query includes a request for DNSSEC information, the proxy server 130 passes the query to the authoritative DNS server 110; if not, the proxy server 130 sets a DNSSEC OK (DO) flag in the query to retrieve the DNSSEC information from the authoritative DNS server 110. The authoritative DNS server 110 responds to the proxy server 130 according to the DNS standard. The proxy server 130 modifies the response from the authoritative DNS server 110 based on the DNSSEC information, original query, query source (IP address), time of day, etc., then transmits the modified response to the recursive DNS server that made the request.

Because the proxy server 130 may retrieve metadata, such as DNSSEC related RRs not requested by the client 120, it removes the metadata from the response when not requested. Relatedly, that DO flag is inside a record called OPT, which some clients don't ask for either, in which case it is removed as well. More generally, modifications to the client query have their results reversed before passing back to the client. Modifications used in various circumstances include: (1) adding an OPT record if not present; (2) setting DO if not set; and (3) adding a client-subnet option with the client source IP address. The proxy server can also add a custom option called EDNS0 Proxy Option (EPO) to pass the client source IP so as to make the transition from the legacy infrastructure more seamless. EPO is useful when working with a modified authoritative DNS server. Of all of these, only the OPT and DO parts are fundamental to the RRSIG approach.

In some implementations, the proxy server 130 modifies the response from the authoritative DNS server 110 according to cryptographic signature information, called the Requested Resource Signature (RRSIG), stored in the DNSSEC record on the authoritative DNS server 110. The proxy server 130 uses both the RRSIG and information encoded in the query, such as the IP address of the query source, to determine if and how to modify the response to the query. In some respects, this approach involves treating the authoritative DNS server 110 as a "memory" for the RRSIG. Because the proxy server 130 modifies the query to return the DNSSEC record, the proxy server 130 does not have to make a separate request for the RRSIG. And because this technique for modifying the query response doesn't involve any extra queries, it places a smaller processing burden on the authoritative DNS server 110 than making separate queries for RRSIGs. That is, the authoritative DNS server 110 can process a single (potentially modified) request from the proxy server 130 more efficiently than it can process two separate requests.

Nevertheless, there are several apparent reasons not to use a proxy server 130 to modify responses to DNS queries. Adding the proxy server 130 adds an extra layer to the network, which increases latency, cost, and complexity. Using the proxy server 130 also doubles the amount of network traffic. But unlike using a modified authoritative DNS server 110, using a proxy server 130 separates advanced DNS functionality from functionality that provides routine DNS service as opposed to mixing them together. Using a proxy server 130 also increases flexibility for providing advanced DNS functionality. And it may be easier and faster to implement new features in a proxy server because the proxy server can be built for feature development. The proxy server 130 can also use a language sufficiently generalized that many new features can be released without any updates to the proxy server itself or to the authoritative DNS server(s). It also makes it practical to overlay advanced features on most DNSSEC ready authoritative DNS systems that may already have been built, with little if any modification.

Using a proxy server 130 with an authoritative DNS server 110 also simplifies maintaining coherency among servers. Some proxy servers 130 keep configuration data for a website, for example, but this configuration data has to be carefully synchronized with the configuration data on the actual content servers. Keeping both the desired advanced feature behavior and the data in the same zone allows these to be kept in sync using standard zone update mechanisms. This is why custom RR types are commonly used rather than another approach altogether—because although a separate database could contain the advanced features, keeping it in sync would be problematic. The proxy approach disclosed herein retains this in-zone property while separating the implementation parts, which is fairly unusual.

With a proxy server 130 coupled to an authoritative DNS server 110, there is no need to maintain changes to an open source or internally developed authoritative server implementations. Using a proxy server 130 also provides the flexibility to use different authoritative DNS server implementations without redeveloping features within each authoritative DNS server. That flexibility allows the feature set to be used in deployments which have very different performance and scaling characteristics. Currently, there are multiple systems to serve these different markets, using different authoritative server implementations. Only a subset of these systems may offer advanced features, and the others address markets, such as the bulk hosting market, where very large numbers (e.g., millions) of zones are present and performance is less sensitive.

All of these systems may then offer advanced features. For example, enterprise DNS generally is performance sensitive, whereas bulk DNS tends to be more concerned with scaling to very large numbers of infrequently accessed zones. Those different access patterns can be better served with different authoritative DNS servers. Additionally, operators may wish to use more than one authoritative DNS server implementation to make their network more resilient, which might otherwise require modifications to support advanced features being made to two different implementations.

A Proxy Server for Intelligent DNS Forwarding

Figure 2:
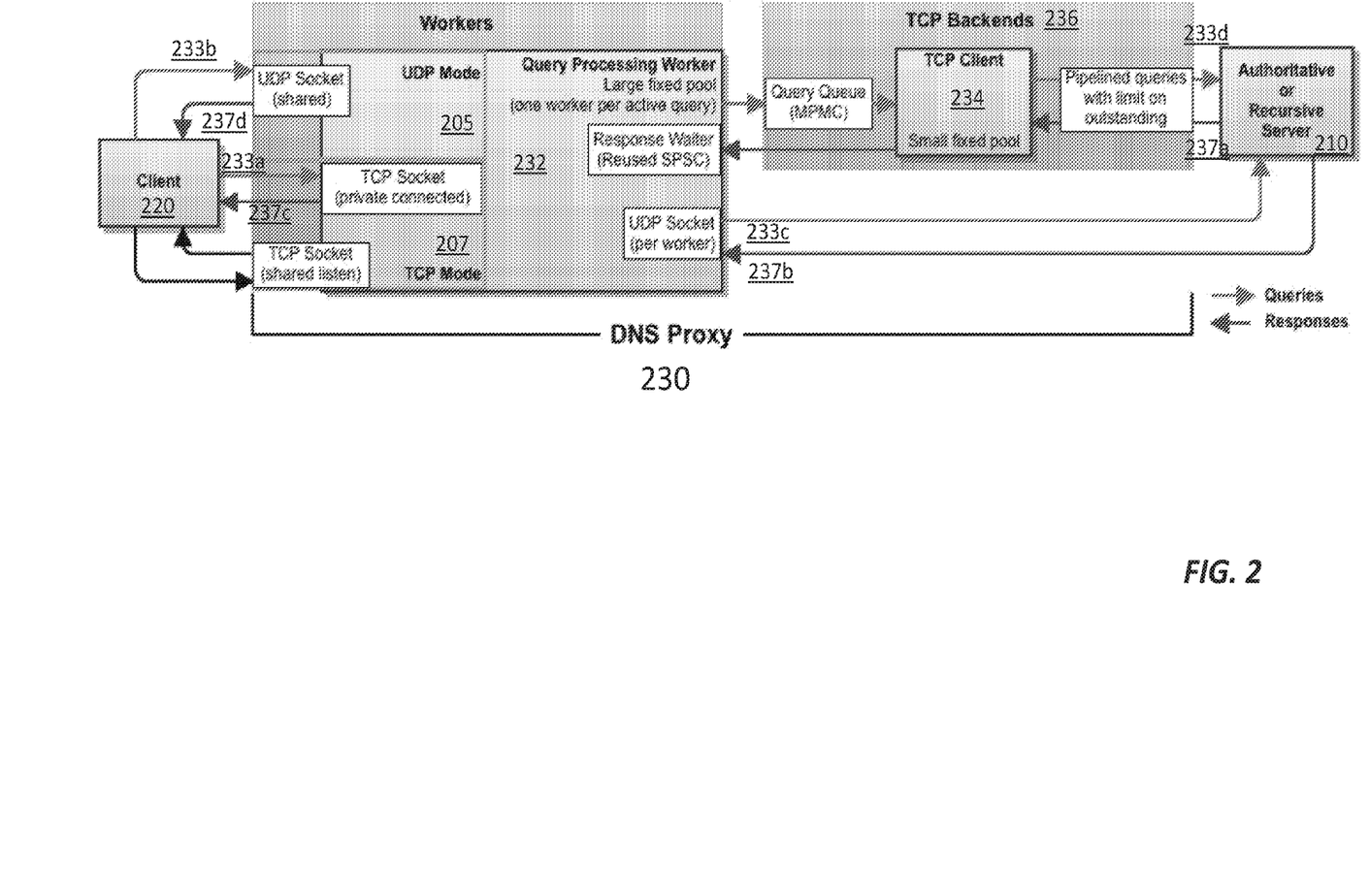
FIG. 2 shows a proxy server that provides advanced DNS services with an (unmodified) authoritative DNS server.

FIG. 2 shows a DNS proxy server 230 that sits in front of a DNS server 210 (e.g., an authoritative DNS server or backend recursive DNS server). In operation, it accepts Transmission Control Protocol (TCP) 207 and User Datagram Protocol (UDP) 205 DNS queries (e.g., DNS queries 233a and 233b) from a client 220 (e.g., a recursive server), and issues DNS queries (e.g., 233c and 233d) to the DNS server 210. The DNS proxy server 230 interprets instructions embedded in the responses from the authoritative DNS server 210 to provide various dynamic responses to the client's queries in a general way, without necessarily storing any configuration regarding those dynamic responses, to reduce or eliminate synchronization concerns. It does not necessarily cache the responses from the authoritative DNS server and does not necessarily depend on a cache for good performance or correct behavior.

More specifically, the DNS proxy server 230 passes a query 233a and/or 233b from the client 220 to the DNS server 210 (with some minor modifications) and awaits the reply. The DNS proxy server 230 includes one or more Query Processing Workers 232 for handling queries 233 (modifying them, sending them to the authoritative or recursive server 210, processing the result, and responding to the client 220). In practice, the proxy server 230 may keep a large collection of uniform workers 232 and hand them queries 233 as the queries arrive, with each worker 232 is committed to a single query 233 at a time. A worker 232 becomes ready for the next query 232 as soon as the response is sent.

One or more TCP Clients 234 in a TCP Backend 236 regulate messages from the workers 232 to the servers 210 and back in a similar one-at-a-time fashion, but can maintain persistent connections to the servers 210 for efficiency. Each TCP Backend 236 is a pool of TCP Clients 234 dedicated to the same server 210. There can be many distinct servers 210, each of which has a corresponding TCP Backend 236 with a pool of TCP Clients 234.

The reply (e.g., 237a and 237b) from the DNS server 230 may contain an answer record for the query, and may optionally also contain one or more RRSIG records. That behavior is present in any DNSSEC compliant DNS server and does not conflict with the intended use of RRSIG records. The RRSIG records may include one using the standardized custom cryptography type, which is then disambiguated with a name which is traceable to a specific owner and thus unique.

After that name, the RRSIG record may carry any data, including an embedded program written in a language sophisticated enough to compose together smaller functions to create desired behaviors. It can also use specific RR types for each behavior/feature, such as the degenerate case of each feature being named in the program. For example, the degenerate case might be expressed in human readable form as: Alias("domain.com"). And a more sophisticated expression that composes more primitive functions (very approximately): ReplaceRR(Qname( ) Qtype( ), LookupRecursive ("domain.com")). It's put in authoritative memory by adding the appropriate RRSIG record into the zone.

The DNS proxy server 230 watches for the embedded program and executes it to generate a modified response to the client's 220 original query. In the course of determining what response the DNS proxy server 230 should send to the client 220, the DNS proxy server 230 may issue additional queries to other systems using DNS or other protocols, or consult other local data. Finally, the proxy server 230 returns a result (e.g., 237c and/or 237d) to the client 220.

In the most common case, no program is embedded in the RRSIG record, so the DNS proxy server 230 can generate a response to the client's query by passing only one query to the authoritative DNS server 210. Conversely, embedding the program in a custom type would require two queries, first one for the custom type to see if there is a program, then one for the data requested. For the RRSIG implementation, the DNS proxy server 230 may make additional queries beyond the initial query depending on the application specific behavior being implemented.

Policy Master and Policy Compiler

The policy master is responsible for storing dynamic steering policies and attachment data from the customers. The policy master generates programs with a policy compiler, which can be implemented as a simple executable wrapper configured to build programs that can be interpreted by the proxy server. The policy compiler provides functions configured to construct programs. Some example functions added to the policy compiler include filter functions and sorting functions for selecting an IP address from among all of the possible IP addresses that could be supplied in response to the DNS query.

In one implementation, the policy compiler includes a BuildResponse function that takes a list of resource records that may go into the final response and a rule function that can alter the list of records by sorting and/or reducing it. Such a function, in addition to arguments to perform the sorting or filtering, also takes a rule function. In this manner, multiple rules can be applied in one policy. A special function End can be used to end the sequence of rules that need to be applied. After applying all the rules, the BuildResponse function can shuffle the (reduced) list of records and construct the DNS response. An example of a BuildResponse program is as below:

```
{
"Program ": "BuildResponse [rr0, rr1, rr2] Available [av1, av2] 
Performance [link1, link2, link3] type Priority [pf1, pf2]
"Consts ": {
"rr0": "800 IN A 1.2.3.1 ",
"rr1": "800 IN A 1.2.3.2 ",
"rr2": "800 IN A 1.2.3.8 ",
"av1": "0:probablyup ",
"av2": "2:definitlydown ",
"link1": "0:27-lo ",
"link2": "2:76",
"link3": "1:tommy ",
"type": "10:relative ",
"pf1": "0:75",
"pf2": "2:33",
"num": "2"
},
"flags": "0001"
```

In this example, Available, Performance, and Priority are rules to perform sorting and filtering. These rules are described further below.

The function Available [av1, av2, . . . ] can filter the list of resource records based on the list of asset mappings where each element maps a resource record index in the list of proposed resource records to an asset identifier. The asset identifier can be used to lookup the availability data from a network resource. Records corresponding to assets that are not available are removed from the list. So "0:asset9998" in the example below means to look up availability for asset "asset9998" and filter out the resource record "rr0" if that asset is marked unavailable. This rule will never leave the list empty: if all records would be removed, no filtering is performed.

Example

```
{
"Program ": "BuildResponse [rr0, rr1, rr2] Available [av1] End ",
"Consts ": {
"rr0": "800 IN A 1.2.3.1 ",
"rr1": "800 IN A 1.2.3.2 ",
"rr2": "800 IN A 1.2.3.8 ",
"av1": "0:asset9998 "
},
"flags": "0001"
}
```

The function Performance [lp1, lp2, . . . ] type can filter the list of resource records based on the list of asset mapping where each element maps a resource record index in the list of proposed resource records, to an asset identifier. The asset identifier can be used to lookup the link's latency data. An asset with no latency data is considered to have maximum latency. Records corresponding to assets that have high latency are removed from the list. So "1:asset1001" in the example below means to look up the link performance data for asset "asset1001" and filter out the resource record "rr1" if that asset has too high of a latency. This rule will never leave the list empty: if all records would be removed, no filtering is performed.

The type argument defines how link performance filtering is applied. It is defined to be a mapping of a non-negative integer value N to a link performance filter option. These options may include:

"count": Return the at most N assets with the lowest latency. Records which have no latency data will not be included, unless no records have latency data.

"absolute": Return the asset with the lowest latency and every asset with latency within N milliseconds.

"relative". Return the asset with the lowest latency and every asset with latency within N percent of a given level.

Example:

```
{
"Program ": "BuildResponse [rr0, rr1, rr2] Performance [lp1, lp2] type 
End ",
"Consts ": {
"rr0": "800 IN A 1.2.3.1 ",
"rr1": "800 IN A 1.2.3.2 ",
"rr2": "800 IN A 1.2.3.8 ",
"lp1": "0:asset1000 ",
"lp2": "1:asset1001 ",
"type": "10:relative "
},
"flags": "0001"
```

The function Priority [pf1, pf2, . . . ] can sort the list of resource records based on the given list of priority mappings where each element maps a resource record index in the list of proposed resource records, to a priority ranking. So "0:20" and "1:10" in the example below means that "rr1" is preferred over "rr0". If records have the same ranking (there is a tie), the proxy server can determine the order at random. A record with no assigned priority will be given an infinite priority. An empty list means there is no priority and the final response will be shuffled. Rank is specified as a 16-bit unsigned integer equivalent (unit16).

Example:

```
{
"Program ": "BuildResponse [rr0, rr1, rr2] Priority [pf1, pf2] End ",
"Consts " : {
"rr0": "800 IN A 1.2.3.1 ",
"rr1": "800 IN A 1.2.3.2 ",
"rr2": "800 IN A 1.2.3.8 ",
"pf1": "0:20",
"pf2": "1:10"
},
"flags": "0001"
```

Other examples of rules can include functions such as Bias to randomly shuffle the list of resource records, Max num to limit the list of resource records, and Reject to remove particular resource records. In addition to rules there can be functions between the BuildResponse and End that set the program in conditional state. When a program is in conditional state, the rule functions will evaluate the conditional state to determine whether to apply the rule or not. Some examples include Switch, Case, Default, and EndSwitch.

DNS Forwarding Using Proxy Server

Figure 3:
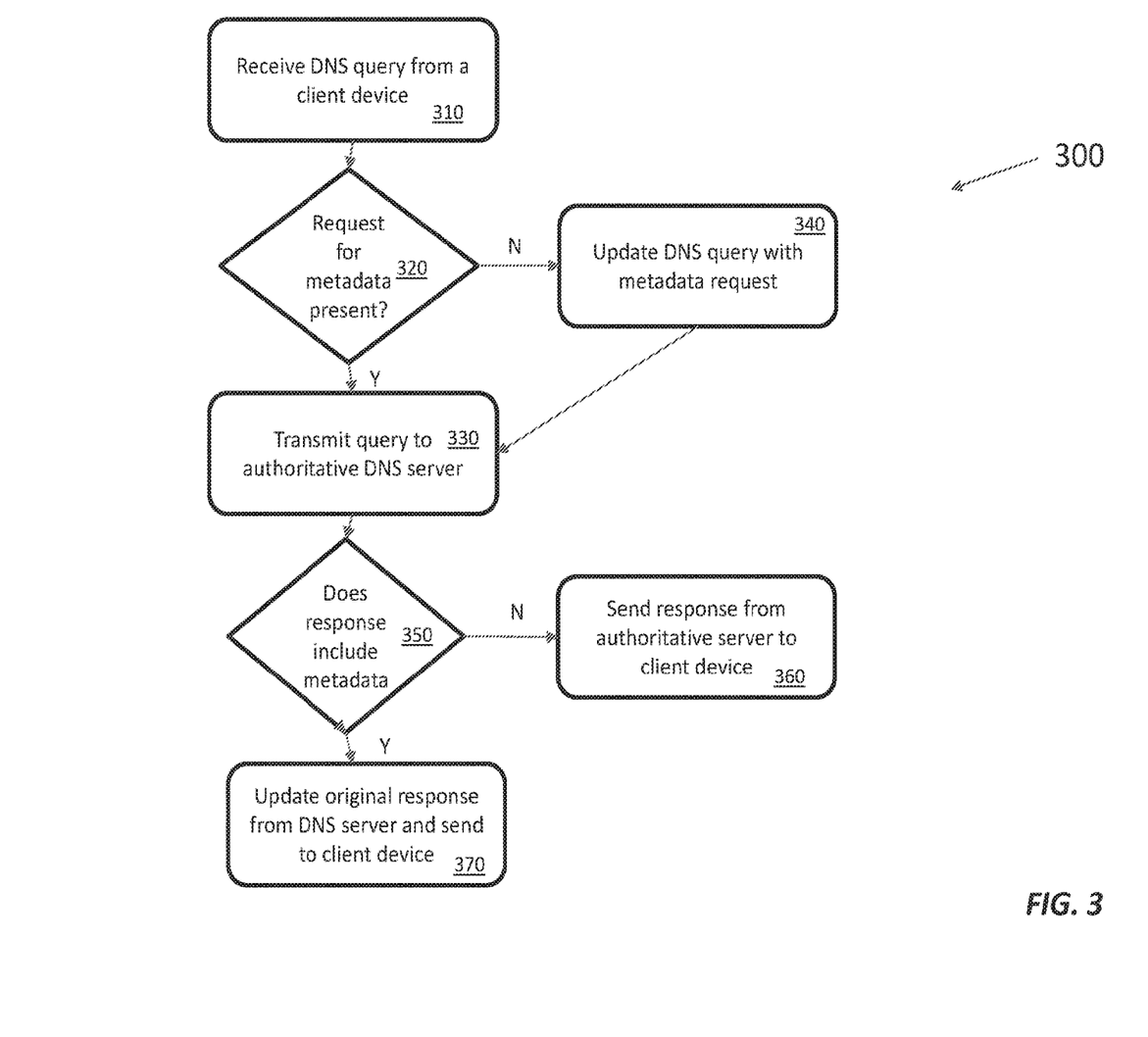
FIG. 3 is a flow diagram illustrating the method of intelligent DNS forwarding by a proxy server.

FIG. 3 is a flow diagram showing a process 300 for providing intelligent DNS forwarding using a proxy server. This process 300 can be implemented using system 100 illustrated in FIG. 1 or any other suitable system or network including a proxy server such as proxy server 130 in FIG. 2. The process 300 involves detecting DNS queries from a client device and processing responses from authoritative DNS servers to provide intelligent DNS forwarding.

When a client device attempts to access a domain, at step 310, it sends a DNS query to the DNS proxy. At step 320, the DNS proxy analyzes the DNS query to determine if the DNS query includes a request for metadata. In one implementation, the DNS proxy inspects the DNS query to determine if the DNS query includes a request for metadata, such as DNSSEC information or OPT records. If the DNS query does include a request for metadata (e.g., request for DNSSEC information), at step 330, the DNS proxy passes the DNS query to the authoritative DNS server. If the DNS query does not include a request for metadata, then at step 340, the DNS query is updated to include a request for metadata. In one implementation, the DNS proxy sets a DNSSEC OK (DO) flag in the DNS query to retrieve the DNSSEC information from the authoritative DNS server. In another implementation, the DNS proxy sets OPT record DO=1 to retrieve OPT records from the authoritative DNS server. At step 330, the DNS proxy passes the updated DNS query to the authoritative DNS server.

At step 350, the DNS proxy determines if the response from the authoritative DNS server includes metadata. In one implementation, the DNS proxy determines if the response includes metadata, e.g., an RRSIG stored in DNSSEC records. In another implementation, the DNS proxy determines if the response includes OPT records. If the response from the authoritative DNS server does not include metadata, at step 360, the DNS response message from the authoritative DNS server is sent to the client device. That is, the proxy server retrieves a DNS record with one or more IP addresses corresponding to the domain name from the authoritative DNS server and sends it to the client device. However, if the response from the authoritative DNS server includes metadata (e.g., RRSIG), then the DNS proxy further processes the metadata to generate a modified response including one of the IP addresses from the authoritative DNS server. At step 370, this modified response generated by the proxy server is sent to the client device.

Figure 4:
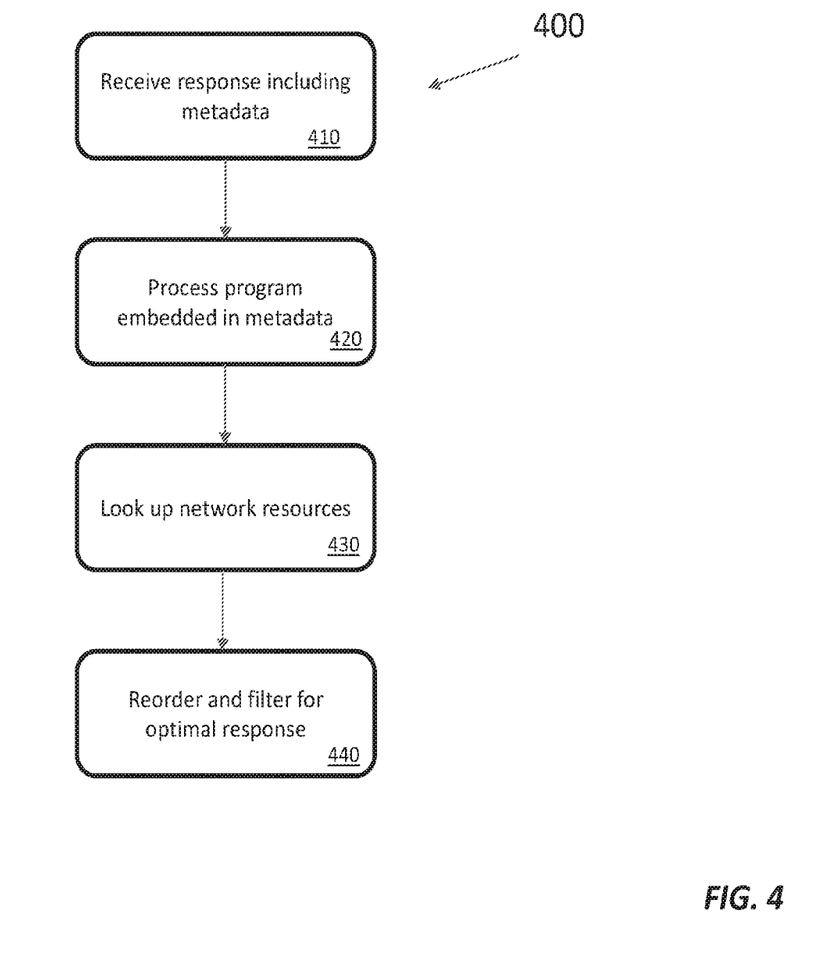
FIG. 4 is a flow diagram showing a method to process metadata from the authoritative DNS server.

FIG. 4 is a flow diagram showing a method 400 of processing metadata from the authoritative DNS server at a proxy server. At step 410, the DNS proxy receives a response from the authoritative DNS server. This response includes metadata and one or more IP addresses. At step 420, the DNS proxy processes one or more programs embedded in the metadata. Programs embedded in the metadata define dynamic steering policies and rules to determine an optimal IP address associated with the domain name. In one implementation, the DNS proxy processes one or more functions embedded in RRSIG. At step 430, the DNS proxy looks up network resources based on embedded rules and functions in the metadata. In one implementation, the DNS proxy executes embedded programs in RRSIG and depending on the rules in RRSIG, the DNS proxy looks up network resources such as link data, subnet data, and asset data. Link data, subnet data, and asset data include information about latency, performance, health, and other information relating to the content IP address and client IP address.

At step 430, the data from the network resources are reordered, sorted, and filtered to determine one optimal IP address associated with the domain name. For example, routes from the client device to the content delivery networks can be sorted based on their latencies, IP origins can be sorted and reordered based on their health. In this manner, the DNS response from the authoritative server is modified to include an optimal answer generated by the DNS proxy. Modified DNS response message is sent to the client device. If the DNS query from the client device did not include a request for metadata, the metadata in the modified DNS response message can be removed before it is sent to the client device.

Figure 5:
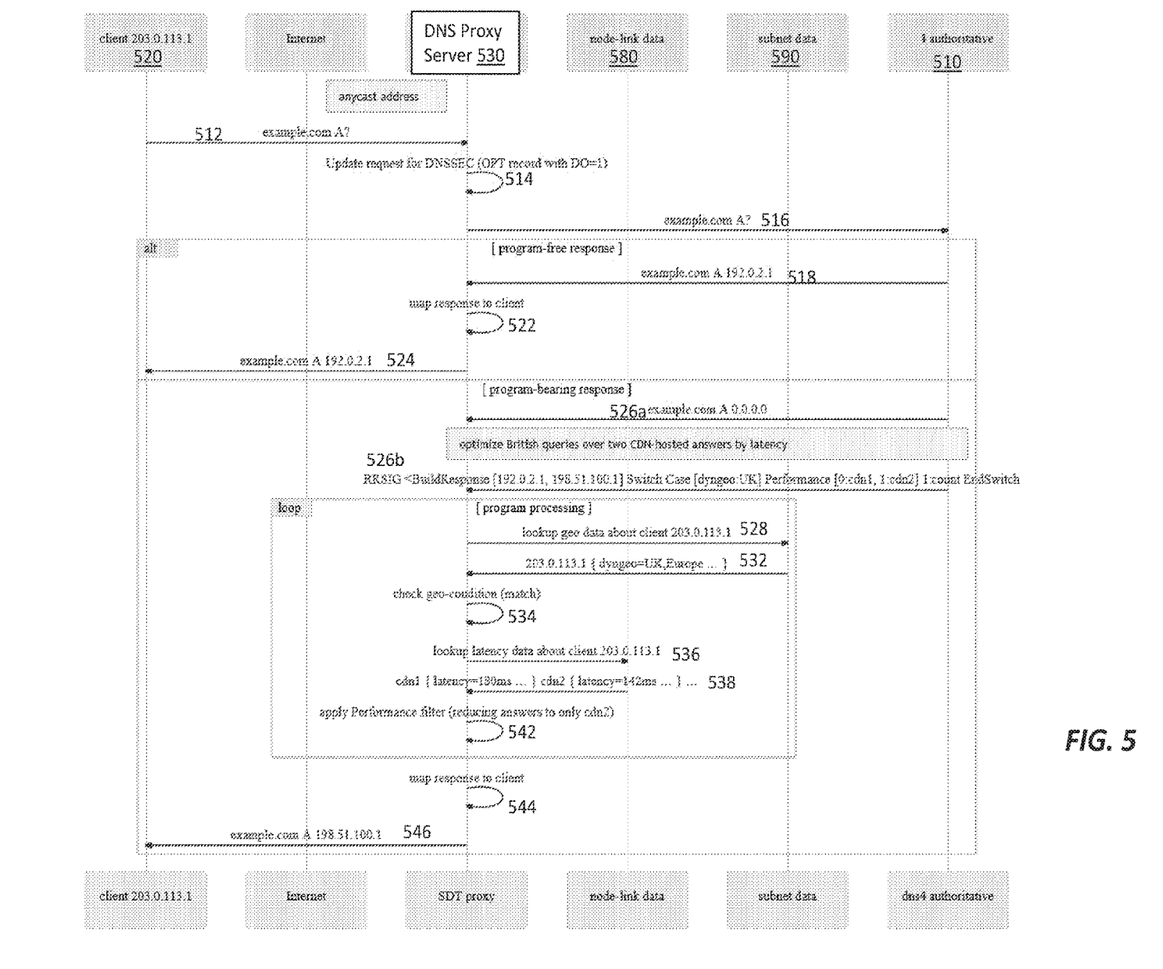
FIG. 5 illustrates an example intelligent DNS forwarding by a proxy server.

FIG. 5 illustrates a more specific example of intelligent DNS forwarding by a proxy server 530. The proxy server 530 can be functionally similar, if not the same as, to proxy server 130 shown in FIG. 1 and proxy server 230 shown in FIG. 2. A client device 520 attempts to access a domain name by sending a DNS query 512 to the authoritative DNS server 510. The proxy server 530 accepts the DNS query 512 and determines if the DNS query 512 includes a request for metadata to be included in the response. Upon determination that the DNS query 512 does not include this request, the query 512 is updated to reflect the request for metadata. The updated DNS request 516 is transmitted to the DNS authoritative server 510 to retrieve DNS records for the domain name. If the DNS authoritative server 510 does not include metadata for the requested domain, the DNS authoritative server 510 transmits a program-free response 518 to the proxy server 530. The program-free response 518 is the target IP address for the domain name without any metadata. At 522, the proxy server 530 maps this program-free response 518 to the client. And at 524, the proxy server 530 returns A or AAAA (IPv4 or IPv6 address) of the domain to the client device 520.

If the authoritative DNS server 510 includes metadata for the requested domain, then the authoritative DNS server 510 provides DNS records including IP address relating to the domain 526a along with requested metadata 526b to the proxy server 530. The "example.com. A 0.0.0.0" in 526a is a "dummy" answer that will be occluded by the dynamic processing instructions in 526b. A fundamental characteristic of RRSIG records is that they are metadata augmenting base data. This aspect of FIG. 5 demonstrates that answer data is present in the response from authoritative 510, even if it will be ignored by proxy 530 because it is accompanied by overriding metadata.

The metadata includes one or more embedded programs to create desired behaviors. The proxy server 530 includes an interpreter to execute the embedded programs in the metadata 526b and generate a modified response. During processing, the proxy server 530 looks up subnet data 590 and/or link data 580 to obtain information relating to latency, performance, health, or other such criteria. The subnet data 590 and link data 580 are network resources that provide answers (e.g., 532 and 538) to the proxy server 530 based on lookup requests (e.g., 528 and 536). The proxy server 530 reorders, filters, and reduces the list of IP addresses based on these answers to determine one optimal IP address. The answer is mapped to the client and a modified DNS response message 546 is sent to the client 320. If the DNS query from the client 320 did not contain a request for metadata, the proxy server 530 removes the metadata from the DNS response message and sends a modified DNS response message 546 with only the IP address to the client device 320.

In this example, client device 320 with IP address 203.0.113.1 attempts to access domain "example.com A". DNS query 512 requesting access to "example.com A" is sent to the proxy server 530. Since the DNS query 512 does not include a request for metadata, that is, the DNS query does not include a request for DNSSEC record, the query 512 is updated by setting the DNSSEC DO flag at 514. The updated request 516 is sent to the authoritative DNS server 510. In a first scenario, presuming that the authoritative DNS server 510 does not include metadata for "example.com", the authoritative DNS server 510 returns a program-free response 518 with the IP address of the CDN corresponding to the domain (e.g., example.com A 192.0.2.1). The program-free response 518 is mapped to the client and the IP address (example.com A 192.0.2.1) 524 is sent to the client.

In a second scenario, presuming that the authoritative DNS server 510 includes metadata, the authoritative DNS server 510 provides RRSIG 526b stored in the DNSSEC records to the proxy server 530. The proxy server 530 executes the "BuildResponse" function included in the RRSIG. The "BuildResponse" function is a rule function that is added to the policy master by one or more customers to store dynamic steering policies for the domain. In this example, the "BuildResponse" function includes arguments for geolocation data (geo data) and latency. At 534, the proxy server 530 looks up geo data for the client 320 by sending a look up request 528 to the subnet. The subnet returns the geo data (dyngeo=UK) for the client in 532. The proxy server 530 analyzes the geo data to determine if the geo data in RRSIG matches the client geo data. The proxy server 530 then looks up performance data for the Content Delivery Networks (CDN) ([0:cdn1, 1:cdn2]) listed in the RRSIG by sending a latency look up request 536 to the link data 580. The link data 580 returns the latency for cdn1 and cdn2. In this example, the latency for cdn1 is 180 ms for cdn1 and the latency for cdn2 is 142 ms. By applying a performance filter function at 542, the proxy server 530 filters out high latency records thereby reducing the answer to cdn2. At 544, the proxy server 530 maps the response to the client, then sends the DNS response message 546 including the IP address of cdn2 (example.com a 198.51.100.1) to the client 320.

Intelligent Data-Free DNS Forwarding Using Canonical Name (CNAME) Records

Advanced DNS services can also be provided with a proxy server that looks for instructions in the target name of a Canonical Name (CNAME) response from an authoritative DNS server. As understood by those of skill in the art, a CNAME record specifies that a domain name is an alias for another domain name, the "canonical" domain. The canonical domain defines all information for the other domain, including subdomains, IP addresses, etc.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of responding to a Domain Name System (DNS) query, the method comprising:
  receiving, by a proxy server from a client, the DNS query;
  generating, by the proxy server, a modified DNS query, wherein generating the modified DNS query comprises modifying the DNS query to include a request for metadata;
  transmitting, by the proxy server to an authoritative DNS server, the modified DNS query;
  receiving, by the proxy server from the authoritative DNS server, a response to the modified DNS query, the response comprising the metadata, wherein the response to the modified DNS query comprises a program included in the metadata and a plurality of IP addresses;
  generating, by the proxy server, a response to the DNS query, based at least in part on the metadata, wherein generating the response to the DNS query comprises executing the program included in the metadata; and
  transmitting, by the proxy server to the client, the response to the DNS query.

2. The method of claim 1, wherein modifying the DNS query comprises setting a DNS Security (DNSSEC) OK (DO) flag in the DNS query.

3. The method of claim 1, wherein the metadata comprises a Requested Resource Signature (RRSIG) record.

4. The method of claim 1, wherein executing the program included in the metadata comprises:
reordering the plurality of IP addresses;
filtering the plurality of IP addresses; and
selecting an IP address from the plurality of IP addresses.

5. The method of claim 1, wherein generating the response to the DNS query comprises removing the metadata from the response to the modified DNS query.

6. The method of claim 1, wherein generating the response to the DNS query comprises applying a sequence of rules to transmit, to the client, the response to the DNS query.

7. A system for responding to a domain name system (DNS) query, the system comprising:
a proxy server in digital communication with a DNS authoritative server and a client device, the proxy server configured to perform operations comprising:
receiving, from the client device, the DNS query;
generating a modified DNS query, wherein generating the modified DNS query comprises modifying the DNS query to include a request for metadata;
transmitting, to the authoritative DNS server, the modified DNS query;
receiving, from the authoritative DNS server, a response to the modified DNS query, the response comprising the metadata, wherein the response to the modified DNS query comprises a program included in the metadata and a plurality of IP addresses;
generating a response to the DNS query, based at least in part on the metadata, wherein generating the response to the DNS query comprises executing the program included in the metadata; and
transmitting, to the client device, the response to the DNS query.

8. The system of claim 7, wherein modifying the DNS query comprises setting a DNS Security (DNSSEC) OK (DO) flag in the DNS query.

9. The system of claim 7, wherein the metadata comprises a Requested Resource Signature (RRSIG) record.

10. The system of claim 7, wherein executing the program comprises: reordering the plurality of IP addresses;
filtering the plurality of IP addresses; and
selecting an IP address from the plurality of IP addresses.

11. The system of claim 7, wherein generating the response to the DNS query comprises removing the metadata from the response to the modified DNS query.

12. The system of claim 7, wherein generating the response to the DNS query comprises applying a sequence of rules to transmit, to the client device, the response to the DNS query.

13. A method of responding to a plurality of Domain Name System (DNS) queries, the method comprising:
receiving, by a proxy server from one or more clients, the plurality of DNS queries;
determining, for each particular DNS query in the plurality of DNS queries, whether the particular DNS query comprises a corresponding request for metadata,
wherein if the particular DNS query comprises the corresponding request for metadata, the proxy server is configured to transmit the particular DNS query to an authoritative DNS server;
in response to determining that a DNS query in the plurality of DNS queries, received from a client of the one or more clients, does not request metadata:
generating, by the proxy server, a modified DNS query, wherein generating the modified DNS query comprises modifying the DNS query to include a request for metadata;
transmitting, by the proxy server to the authoritative DNS server, the modified DNS query;
receiving, by the proxy server from the authoritative DNS server, a response to the modified DNS query, the response comprising the metadata, wherein the response to the modified DNS query comprises a program included in the metadata and a plurality of IP addresses;
generating, by the proxy server, a response to the DNS query, based at least in part on the metadata, wherein generating the response to the DNS query comprises executing the program included in the metadata; and
transmitting, by the proxy server to the client, the response to the DNS query.

14. The method of claim 13, wherein the IP address is selected based on at least one of a latency, an availability, or a priority of the IP address.

15. The method of claim 13, further comprising:
removing the metadata from the response to the modified DNS query before transmitting, to the client, the response to the DNS query.

* * * * *